US011967297B2

(12) United States Patent
Wang et al.

(10) Patent No.: US 11,967,297 B2
(45) Date of Patent: Apr. 23, 2024

(54) COLOR MODULATION METHOD AND APPARATUS FOR DISPLAY, ELECTRONIC DEVICE, AND STORAGE MEDIUM

(71) Applicant: BOE TECHNOLOGY GROUP CO., LTD., Beijing (CN)

(72) Inventors: Xian Wang, Beijing (CN); Masakazu Okamura, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 78 days.

(21) Appl. No.: 17/787,106

(22) PCT Filed: Mar. 26, 2021

(86) PCT No.: PCT/CN2021/083124
§ 371 (c)(1),
(2) Date: Jun. 17, 2022

(87) PCT Pub. No.: WO2021/197213
PCT Pub. Date: Oct. 7, 2021

(65) Prior Publication Data

US 2022/0392421 A1 Dec. 8, 2022

(30) Foreign Application Priority Data

Mar. 31, 2020 (CN) ......................... 202010240526.2

(51) Int. Cl.
*G09G 5/06* (2006.01)
*G06T 5/00* (2006.01)
*G09G 5/02* (2006.01)

(52) U.S. Cl.
CPC ................. *G09G 5/06* (2013.01); *G06T 5/00* (2013.01); *G09G 5/02* (2013.01); *G09G 2320/0666* (2013.01); *G09G 2340/06* (2013.01)

(58) Field of Classification Search
CPC ............. G09G 5/06; G09G 2320/0666; G09G 2340/06; G09G 2320/0242; G09G 5/02; G06T 5/00
See application file for complete search history.

(56) References Cited

U.S. PATENT DOCUMENTS

2003/0184557 A1* 10/2003 Wen ...................... G06T 11/001 345/590
2006/0274386 A1 12/2006 Wakazono et al.
(Continued)

FOREIGN PATENT DOCUMENTS

CN 101123080 A 2/2008
CN 101195305 A 6/2008
(Continued)

OTHER PUBLICATIONS

The First Office Action for the Chinese Patent Application No. 202010240526.2 issued by the Chinese Patent Office dated Mar. 7, 2022.

(Continued)

*Primary Examiner* — Daniel F Hajnik
(74) *Attorney, Agent, or Firm* — IP & T GROUP LLP

(57) ABSTRACT

A color modulation method for a display includes: obtaining a group of original RGB data of a pixel of an image; calling a display look-up-table (LUT) to determine whether a group of RGB mapped data corresponding to the group of original RGB data is present in the display LUT; if in, performing color modulation using the group of RGB mapped data corresponding to the group of original RGB data; and if not in, using the group of original RGB data, a plurality of groups of selected RGB data, and a group of RGB mapped data corresponding to each group of selected RGB data in combination with a predetermined interpolation algorithm to calculate the group of RGB mapped data corresponding to the group of original RGB data, and then using the obtained group of RGB mapped data to perform the color modulation.

16 Claims, 5 Drawing Sheets

(56) References Cited

U.S. PATENT DOCUMENTS

| | | | |
|---|---|---|---|
| 2007/0247648 A1 | 10/2007 | Brito et al. | |
| 2007/0296990 A1 | 12/2007 | Kakutani | |
| 2012/0169719 A1 | 7/2012 | Kim et al. | |
| 2012/0237120 A1* | 9/2012 | Kulkarni | H04N 1/603 382/162 |
| 2016/0180758 A1 | 6/2016 | Buckley | |
| 2016/0240123 A1 | 8/2016 | Wu et al. | |
| 2017/0339316 A1 | 11/2017 | Bordes et al. | |
| 2020/0193891 A1 | 6/2020 | Sun et al. | |

FOREIGN PATENT DOCUMENTS

| | | | |
|---|---|---|---|
| CN | 101272507 | A | 9/2008 |
| CN | 103955079 | A | 7/2014 |
| CN | 104795049 | A | 7/2015 |
| CN | 107148648 | A | 9/2017 |
| CN | 108446089 | A | 8/2018 |
| CN | 108717839 | A | 10/2018 |
| CN | 109741279 | A | 5/2019 |
| CN | 109859702 | A | 6/2019 |
| CN | 110675797 | A | 1/2020 |
| KR | 10-2012-0077754 | A | 7/2012 |
| TW | 201636980 | A | 10/2016 |

OTHER PUBLICATIONS

The Second Office Action for the Chinese Patent Application No. 202010240526.2 issued by the Chinese Patent Office dated Aug. 8, 2022.

The Third Office Action for the Chinese Patent Application No. 202010240526.2 issued by the Chinese Patent Office dated Nov. 9, 2022.

* cited by examiner

COLOR MODULATION METHOD AND APPARATUS FOR DISPLAY, ELECTRONIC DEVICE, AND STORAGE MEDIUM

CROSS-REFERENCE TO RELATED APPLICATIONS

This application is a national phase entry under 35 USC 371 of International Patent Application No. PCT/CN2021/083124, filed on Mar. 26, 2021, which claims priority to Chinese Patent Application No. 202010240526.2, filed on Mar. 31, 2020, which are incorporated herein by reference in their entirety.

TECHNICAL HELD

The present disclosure relates to the field of data processing technologies, and in particular, to a color modulation method for a display, a color modulation apparatus for a display, an electronic device, and a non-transitory computer-readable storage medium.

BACKGROUND

Ultra-high-resolution displays have always been in pursuit of high-quality display effect, and more and more displays have begun to develop their own three-dimensional look-up-tables (3D LUTs, also referred to as display LUTs) for color modulation. Existing high-resolution professional displays mostly adopt 3D LUT technology for image quality modulation to map each pixel of an image, which takes up a lot of hardware resources and results in very high costs.

SUMMARY

In an aspect, a color modulation method for a display is provided. The color modulation method includes: obtaining a group of original RGB data of a pixel of an image; calling a display look-up-table (LUT) to determine whether a group of RGB mapped data corresponding to the group of original RGB data is present in the display LUT; if the group of RGB mapped data corresponding to the group of original RGB data is present in the display LUT, performing color modulation on the image using the group of RGB mapped data corresponding to the group of original RGB data; and if no group of RGB mapped data corresponding to the group of original RGB data is present in the display LUT, calculating the group of RGB mapped data corresponding to the group of original RGB data using the group of original RGB data, a plurality of groups of selected RGB data, and a group of RGB mapped data corresponding to each group of selected RGB data in combination with a predetermined interpolation algorithm, and performing the color modulation on the image using the group of RGB mapped data obtained through calculation. The display LUT includes the plurality of groups of selected RGB data and the group of RGB mapped data corresponding to each group of selected RGB data; the groups of selected RGB data are some groups of original RGB data selected from groups of original RGB data corresponding to the display within value ranges of the groups of original RGB data corresponding to the display.

In some embodiments, the color modulation method further includes: determining value ranges Ns corresponding to a R value, a G value and a B value included in the group of original RGB data according to a data size of a signal source of the display; taking M R values from a value range N corresponding to the R value as selected R values according to a first value interval; taking O G values from a value range N corresponding to the G value as selected G values according to a second value interval; taking P B values from a value range N corresponding to the B value as selected B values according to a third value interval; obtaining M×O×P groups of selected RGB data according to the M selected R values, O selected G values and P selected B values; calculating the group of RGB mapped data corresponding to each group of selected RGB data; and establishing the display LUT according to the M×O×P groups of selected RGB data and the group of RGB mapped data corresponding to each group of selected RGB data.

In some embodiments, a value of the first value interval is an a-th power of 2, a value of the second value interval is a b-th power of 2, and a value of the third value interval is a c-th power of 2, wherein a, b and c are all positive integers, and the first value interval, the second value interval, and the third value interval are all smaller than the value ranges Ns.

In some embodiments, values of the first value interval, the second value interval and the third value interval are equal.

In some embodiments, calculating the group of RGB mapped data corresponding to the group of original RGB data using the group of original RGB data, the plurality of groups of selected RGB data and the group of RGB mapped data corresponding to each group of selected RGB data, in combination with the predetermined interpolation algorithm includes: determining a segment that the R value included in the group of original RGB data is in the M selected R values, a segment that the G value included in the group of original RGB data is in the O selected G values, and a segment that the B value included in the group of original RGB data is in the P selected B values according to the group of original RGB data and the plurality of groups of selected RGB data; determining a group of first target RGB data according to small endpoint values of segments that the R value, the G value and the B value in the group of original RGB data are respectively in; determining a group of second target RGB data according to large endpoint values of the segments that the R value, the G value and the B value in the group of original RGB data are respectively in; and calculating the group of RGB mapped data corresponding to the group of original RGB data using the predetermined interpolation algorithm in combination with the group of original RGB data, a group of RGB mapped data corresponding to the group of first target RGB data, and a group of RGB mapped data corresponding to the group of second target RGB data.

In some embodiments, the predetermined interpolation algorithm is a linear interpolation algorithm.

In some embodiments, calculating the group of RGB mapped data corresponding to each group of selected RGB data includes: for each group of selected RGB data, obtaining corresponding tristimulus values through calculation in combination with a first conversion formula; and obtaining the group of RGB mapped data corresponding to each group of selected RGB data according to the tristimulus values obtained through calculation in combination with a second conversion formula. The first conversion formula is that the tristimulus values are equal to a first conversion matrix multiplied by a group of RGB data, and the second conversion formula is that the tristimulus values are equal to a second conversion matrix multiplied by a group of RGB mapped data.

In some embodiments, a calculation method of the first conversion matrix includes: obtaining color coordinates of three primary colors of red, green and blue designated in a preselected color space standard; obtaining color coordinates of white when a screen of the display is on as white; and obtaining the first conversion matrix through calculation according to the color coordinates of the three primary colors of red, green and blue and the color coordinates of white in combination with the first conversion formula.

In some embodiments, a calculation method of the second conversion matrix includes: obtaining color coordinates of red, green, blue and white when a screen of the display is on using each group of selected RGB data; and for each group of selected RGB data, obtaining a corresponding second conversion matrix through calculation according to the obtained color coordinates of red, green, blue and white in combination with the second conversion formula.

In some embodiments, the color modulation method further includes; outputting the image after the color modulation from the display.

In another aspect, a color modulation apparatus for a display is provided. The color modulation apparatus includes an input component, a memory and a processor. The input component is configured to obtain a group of original RGB data of a pixel of an image. The memory stores a display look-up-table (LUT) thereon. The processor is configured to: call the display LUT to determine whether a group of RGB mapped data corresponding to the group of original RGB data is present in the display LUT; in a case where the group of RGB mapped data corresponding to the group of original RGB data is present in the display LUT, perform color modulation on the image using the group of RGB mapped data corresponding to the group of original RGB data; and in a case where no group of RGB mapped data corresponding to the group of original RGB data is present in the display LUT, calculate the group of RGB mapped data corresponding to the group of original RGB data using the group of original RGB data, a plurality of groups of selected RGB data, and a group of RGB mapped data corresponding to each group of selected RGB data in combination with a predetermined interpolation algorithm, and perform the color modulation on the image using the group of RGB mapped data obtained through calculation. The display LUT includes the plurality of groups of selected RGB data and the group of RGB mapped data corresponding to each group of selected RGB data; the groups of selected RGB data are some groups of original RGB data selected from groups of original RGB data corresponding to the display within value ranges of the groups of original RGB data corresponding to the display.

In some embodiments, the processor is further configured to: determine value ranges Ns corresponding to a R value, a G value and a B value included in the group of original RGB data according to a data size of a signal source of the display; take M R values from a value range N corresponding to the R value as selected R values according to a first value interval; take O G values from a value range N corresponding to the G value as selected G values according to a second value interval; take P B values from a value range N corresponding to the B value as selected B values according to a third value interval; obtain M×O×P groups of selected RGB data according to the M selected R values, O selected G values and P selected B values; calculate the group of RGB mapped data corresponding to each group of selected RGB data; and establish the display LUT according to the M×O×P groups of selected RGB data and the group of RGB mapped data corresponding to each group of selected RGB data.

In some embodiments, the processor is further configured to: determine a segment that the R value in the group of original RGB data is in the M selected R values, a segment that the G value in the group of original RGB data is in the O selected G values, and a segment that the B value in the group of original RGB data is in the P selected B values according to the group of original RGB data and the plurality of groups of selected RGB data; determine a group of first target RGB data according to small endpoint values of segments that the R value, the G value and the B value in the group of original RGB data are respectively in; determine a group of second target RGB data according to large endpoint values of the segments that the R value, the G value and the B value in the group of original RGB data are respectively in; and calculate the group of RGB mapped data corresponding to the group of original RGB data using the predetermined interpolation algorithm in combination with the group of original RGB data, a group of RGB mapped data corresponding to the group of first target RGB data, and a group of RGB mapped data corresponding to the group of second target RGB data.

In some embodiments, the processor is further configured to: for each group of selected RGB data, obtaining corresponding tristimulus values through calculation in combination with a first conversion formula, wherein the first conversion formula is that the tristimulus values are equal to a first conversion matrix multiplied by a group of RGB data; and obtaining the group of RGB mapped data corresponding to each group of selected RGB data according to the tristimulus values obtained through calculation in combination with a second conversion formula, wherein the second conversion formula is that the tristimulus values are equal to a second conversion matrix multiplied by a group of RGB mapped data.

In some embodiments, the processor is further configured to: obtain color coordinates of three primary colors of red, green and blue designated in a preselected color space standard; obtain color coordinates of white when a screen of the display is on as white; and obtain the first conversion matrix through calculation according to the color coordinates of the three primary colors of red, green and blue and the color coordinates of white in combination with the first conversion formula.

In some embodiments, the processor is further configured to: light the display using each group of selected RGB data in the M×O×P groups of selected RGB data; obtain color coordinates of red, green, blue and white when the screen of the display is on according to each group of selected RGB data; and for each group of selected RGB data, obtain a corresponding second conversion matrix through calculation according to the obtained color coordinates of red, green, blue and white in combination with the second conversion formula.

In yet another aspect, an electronic device is provided. The electronic device includes a memory, a processor and computer programs stored in the memory and executable on the processor. When executing the computer programs, the processor performs one or more steps in the color modulation method for the display according to any of the above embodiments.

In yet another aspect, a non-transitory computer-readable storage medium is provided. The non-transitory computer-readable storage medium stores therein computer instructions, and the computer instructions are configured to perform one or more steps in the color modulation method for the display according to any of the above embodiments.

BRIEF DESCRIPTION OF THE DRAWINGS

In order to describe technical solutions in the present disclosure more dearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on actual sizes of products, actual processes of methods and actual timings of signals to which the embodiments of the present disclosure relate.

DETAILED DESCRIPTION

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to".

In the description of the specification, the term such as "some embodiments", "exemplary embodiments" or "example" is intended to indicate that specific features, structures, materials or characteristics related to the embodiment(s) or example(s) are included in at least one embodiment or example of the present disclosure. Schematic representation of the above term does not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a plurality of" or "the plurality of" means two or more unless otherwise specified.

The use of the phrase "configured to" herein means an open and inclusive language, which does not exclude apparatuses that are applicable to or configured to perform additional tasks or steps.

Figure 1:
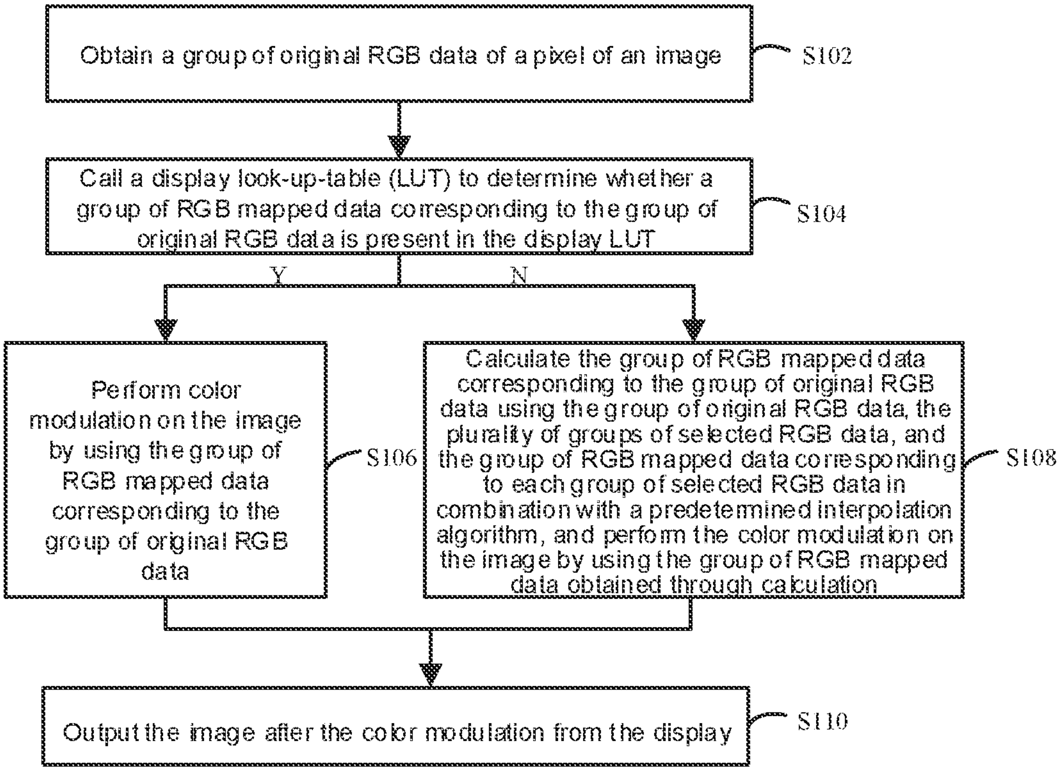
FIG. 1 is a flow diagram of a color modulation method, in accordance with some embodiments.

Some embodiments of the present disclosure provide a color modulation method for a display. Referring to FIG. 1, the color modulation method includes the following steps (S102 to S110).

In S102, a group of original RGB data of a pixel of an image is obtained.

The group of original RGB data is determined according to information contained in an input signal. For each pixel of the displayed image, there is information of corresponding group of original RGB data in the input signal.

In S104, a display look-up-table (LUT) is called to determine whether a group of RGB mapped data corresponding to the group of original RGB data is present in the display LUT.

The display LUT is essentially a random access memory (abbreviated as RAM). After the display LUT writes data into the RAM in advance, whenever a signal (e.g., the group of original RGB data) is input, it is equivalent to inputting an address to look up the table, finding out content (e.g., the group of RGB mapped data) corresponding to the address, and then outputting the content.

The display LUT includes a plurality of groups of selected RGB data, and a group of RGB mapped data corresponding to each group of selected RGB data. The groups of selected RGB data are some groups of RGB data selected from groups of original RGB data corresponding to the display according to a preset manner within value ranges of the groups of original RGB data corresponding to the display. In this way, the display LUT does not need to store groups of RGB mapped data corresponding to all groups of original RGB data, and in turn, storage resources may be saved.

The group of RGB mapped data corresponding to the group of original RGB data being present in the display LUT means that a group of selected RGB data same as the group of original RGB data is present in the display LUT, and the group of RGB mapped data corresponding to the group of selected RGB data is present in the display LUT.

In 106 if the group of RGB mapped data corresponding to the group of original RGB data is present in the display LUT, color modulation is performed on the image by using the group of RGB mapped data corresponding to the group of original RGB data.

That is, if the group of selected RGB data same as the group of original RGB data is present in the display LUT, the color modulation is performed on the image for the group of original RGB data by using the group of RGB mapped data corresponding to the group of selected RGB data.

In S108, if no group of RGB mapped data corresponding to the group of original RGB data is present in the display LUT, the group of RGB mapped data corresponding to the group of original RGB data is calculated using the group of original RGB data, the plurality of groups of selected RGB data, and the group of RGB mapped data corresponding to each group of selected RGB data in combination with a predetermined interpolation algorithm, and the color modulation is performed on the image by using the group of RGB mapped data obtained through calculation.

For example, the predetermined interpolation algorithm may be a linear interpolation algorithm. In this way, results obtained through interpolation may be distributed uniformly, and in turn, the image after the color modulation may be uniform and smooth.

Figure 2:
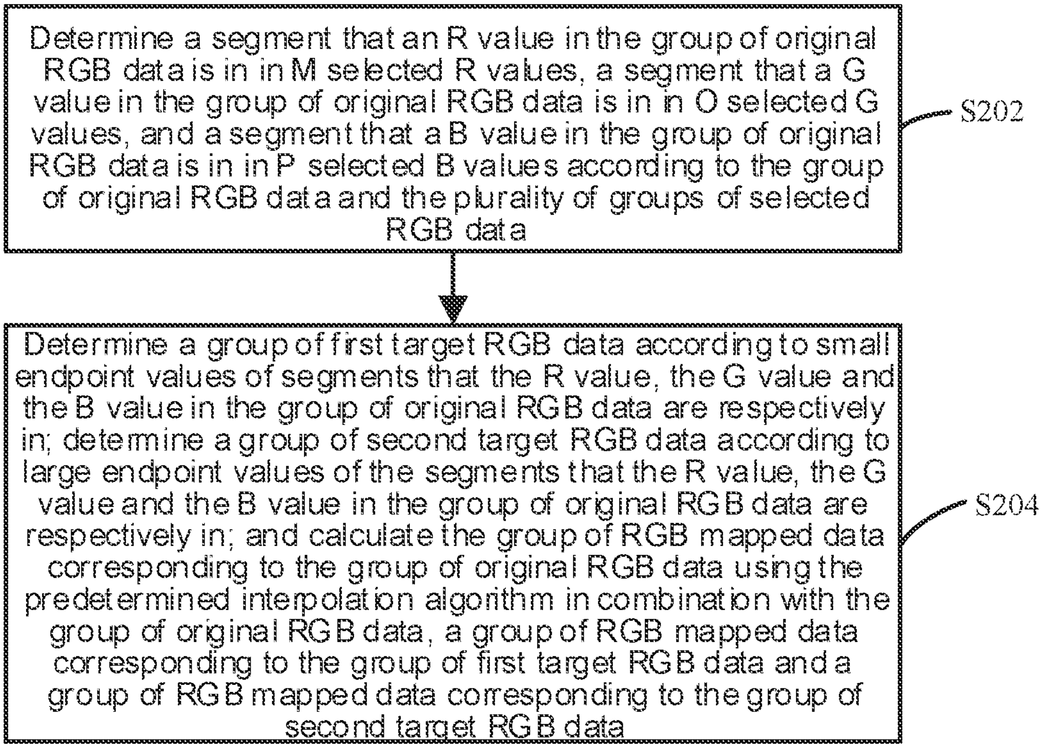
FIG. 2 is a flow diagram of calculating RGB mapped data corresponding to selected RGB data, in accordance with some embodiments.

In some embodiments, referring to FIG. 2, calculating the group of RGB mapped data corresponding to the group of original RGB data using the group of original RGB data, the plurality of groups of selected RGB data, and the group of RGB mapped data corresponding to each group of selected RGB data in combination with the predetermined interpolation algorithm includes the following steps (202 to 204).

In 202, a segment that a R value in the group of original RGB data is in M selected R values, a segment that a G value in the group of original RGB data is in O selected G values, and a segment that a B value in the group of original RGB data is in in P selected B values are determined according to the group of original RGB data and the plurality of groups of selected RGB data.

In the display LUT provided by the embodiments of the present disclosure, only some groups of RGB data are selected as the groups of selected RGB data from the groups of original RGB data within the value ranges of the groups of original RGB data, and the group of RGB mapped data corresponding to each group of selected RGB data is calculated and stored. If no group of selected RGB data same as the group of original RGB data is present in the display LUT, that is, if no group of RGB mapped data corresponding to the group of original RGB data is present in the display LUT, the corresponding group of RGB mapped data needs to be calculated by using the predetermined interpolation algorithm.

In some embodiments, value ranges Ns corresponding to the R value, the G value and the B value included in the group of original RGB data are determined according to a data size of a signal source of the display.

For example, considering an example where the data size of the signal source is 8 bit, the value ranges corresponding to the R value, the G value and the B value included in the group of original RGB data are all 0 to 255, that is, N is 0 to 255.

M R values are taken from a value range N corresponding to the R value as selected R values according to a first value interval, O G values are taken from a value range N corresponding to the G value as selected G values according to a second value interval, and P B values are taken from a value range N corresponding to the B value as selected B values according to a third value interval, The M selected R values, the O selected G values, and the P selected B values are combined to obtain M×O×F groups of selected RGB data.

For example, a value of the first value interval is an a-th power of 2, a value of the second value interval is a b-th power of 2, and a value of the third value interval is a c-th power of 2, where a, b and c are all positive integers, and the first value interval, the second value interval, and the third value interval are all smaller than the value ranges N. As a result, the M selected R values divide the value range corresponding to the R value in the group of original RGB data into M segments, the O selected G values divide the value range corresponding to the G value in the group of original RGB data into O segments, and the P selected B values divide the value range corresponding to the B value in the group of original RGB data into P segments.

For the M×O×P groups of selected RGB data, the group of RGB mapped data corresponding to each group of selected RGB data is calculated, and the M×O×P groups of selected RGB data and the group of RGB mapped data corresponding to each group of selected RGB data are stored in the display LUT in an associated manner.

In a case where the group of RGB mapped data corresponding to the group of original RGB data needs to be calculated by using the predetermined interpolation algorithm, the segment that the R value in the group of original RGB data is in the M selected R values, the segment that the G value in the group of original RGB data is in the O selected G values, and the segment that the B value in the group of original RGB data is in the P selected B values are determined according to the R value, the G value and the B value in the group of original RGB data.

In S204, a group of first target RGB data is determined according to small endpoint values of segments that the R value, the G value and the B value in the group of original RGB data are respectively in: a group of second target RGB data is determined according to large endpoint values of the segments that the R value, the G value and the B value in the group of original RGB data are respectively in; and the group of RGB mapped data corresponding to the group of original RGB data is calculated using the predetermined interpolation algorithm in combination with the group of original RGB data, a group of RGB mapped data corresponding to the group of first target RGB data and a group of RGB mapped data corresponding to the group of second target RGB data.

Figure 3A:
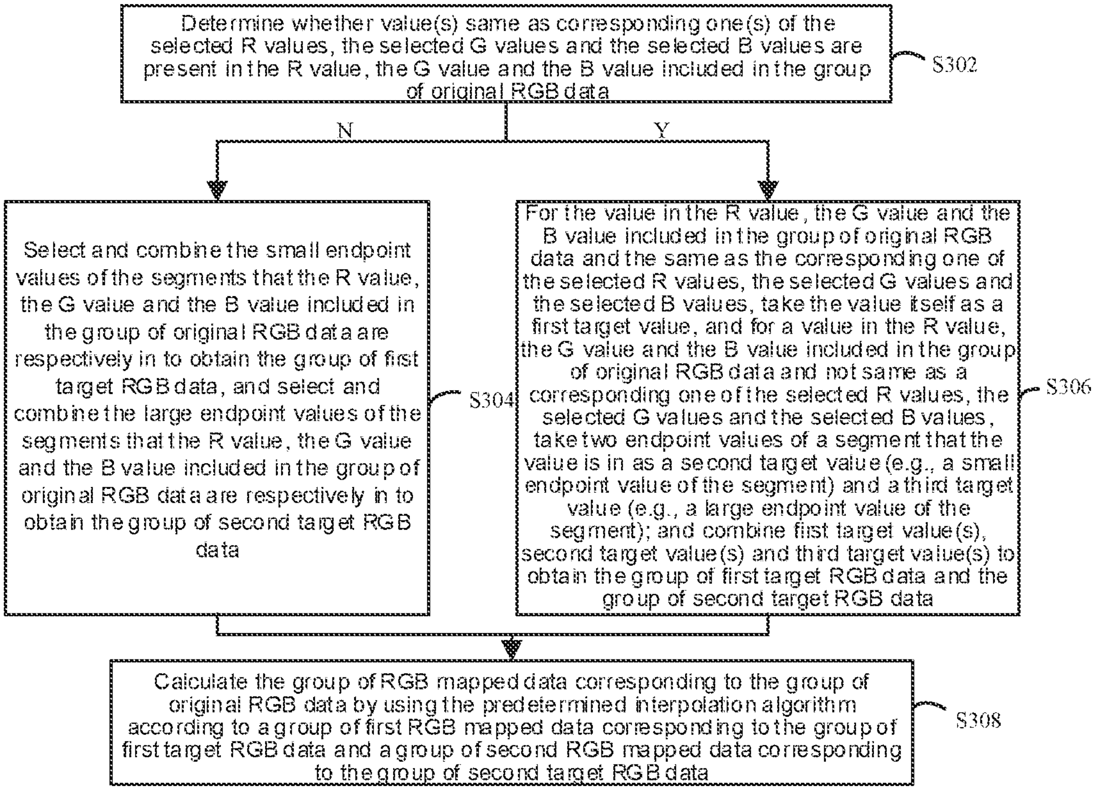
FIG. 3A is a flow diagram of calculating RGB mapped data corresponding to original RGB data by using a predetermined interpolation algorithm, in accordance with some embodiments.

In some embodiments, as shown in FIG. 3A, determining the group of first target RGB data according to the small endpoint values of the segments that the R value, the G value and the B value in the group of original RGB data are respectively in; determining the group of second target RGB data according to the large endpoint values of the segments that the R value, the G value and the B value in the group of original RGB data are respectively in; and calculating the group of RGB mapped data corresponding to the group of original RGB data using the predetermined interpolation algorithm in combination with the group of original RGB data, the group of RGB mapped data corresponding to the group of first target RGB data and the group of RGB mapped data of the group corresponding to second target RGB data, includes the following steps (302 to 308).

In S302, it is determined whether value(s) same as corresponding one(s) of the selected R values, the selected G values and the selected B values are present in the R value, the G value and the B value included in the group of original RGB data.

For example, considering an example where the data size of the signal source is 8 bit, and the first value interval, the second value interval and the third value interval are all selected to be 4, the selected R values, the selected G values and the selected B values all include 0, 4, 8, 12, . . . , 124, 128, 132, 136, . . . , 248 and 252, so that $64^3$ groups of selected RGB data may be obtained.

For example, the group of original RGB data is (1, 1, 0); then, the R value included in the group of original RGB data is in a segment of "0 to 4" in 64 selected R values, the G value included in the group of original RGB data is in a segment of "0 to 4" in 64 selected G values, and the B value included in the group of original RGB data is same as a selected B value "0". That is, a value same as a corresponding one of the selected R values, the selected G values and the selected B values is present in the R value, the G value and the B value included in the group of original RGB data. It will be noted that, at most two of the R value, the G value and the B value included in the group of original RGB data are same as corresponding values in the selected R values, the selected G values and the selected B values.

For example, the group of original RGB data is (1, 1, 1); then, the R value included in the group of original RGB data is in the segment of "0 to 4" in the 64 selected R values, the G value included in the group of original RGB data is in the segment of "0 to 4" in the 64 selected G values, and the B value included in the group of original RGB data is in a segment of "0 to 4" in 64 selected B values. That is, no value same as a corresponding one of the selected R values, the selected G values and the selected B values is present in the R value, the G value and the B value included in the group of original RGB data.

In 304, if no value same as the corresponding one of the selected R values, the selected G values and the selected B values is present in the R value, the G value and the B value included in the group of original RGB data, the small endpoint values of the segments that the R value, the G value and the B value included in the group of original RGB data are respectively in are selected and combined to obtain the group of first target RGB data, and the large endpoint values of the segments that the R value, the G value and the B value included in the group of original RGB data are respectively in are selected and combined to obtain the group of second target RGB data.

If the group of original RGB data is (1, 1, 1), the group of first target RGB data is (0, 0, 0), and the group of second target RGB data is (4, 4, 4). The group of RGB mapped data corresponding to the group of first target RGB data and the group of RGB mapped data corresponding to the group of second target RGB data exist in the display LUT.

In 306, if the value(s) same as the corresponding one(s) of the selected R values, the selected G values and the selected B values are present in the R value, the G value and the B value included in the group of original RGB data, for the value in the R value, the G value and the B value included in the group of original RGB data and the same as the corresponding one of the selected R values, the selected G values and the selected B values, the value itself is taken as a first target value, and for a value in the R value, the G value and the B value included in the group of original RGB data and not same as a corresponding one of the selected R values, the selected G values and the selected B values, a small endpoint value of a segment that the value is in is taken as a second target value, and a large endpoint value of the segment that the value is in is taken as a third target value. First target value(s) and second target value(s) are combined to obtain the group of first target RGB data, and the first target value(s) and third target value(s) are combined to obtain the group of second target RGB data.

For example, the group of original RGB data is (1, 1, 0). The B value "0" included in the group of original RGB data is same as a selected B value, and then the B value "0" included in the group of original RGB data is a first target value. The R value "1" included in the group of original RGB data is different from any selected R value, and the R value "1" included in the group of original RGB data is in the segment of "0 to 4" in the 64 selected R values, and then the endpoint value "0" is taken as a second target value, and the endpoint value "4" is taken as a third target value. Similarly, for the G value "1" included in the group of original RGB data, a second target value is "0" and a third target value is "4". The first target value and second target values are combined to obtain a group of first target RGB data (0, 0, 0), and the first target value and third target values are combined to obtain a group of second target RGB data (4, 4, 0). For example, the group of original RGB data is (1, 1, 1), similarly, it may be obtained that a group of first target RGB data is (0, 0, 0), and a group of second target RGB data is (4, 4, 4).

Figure 3B:
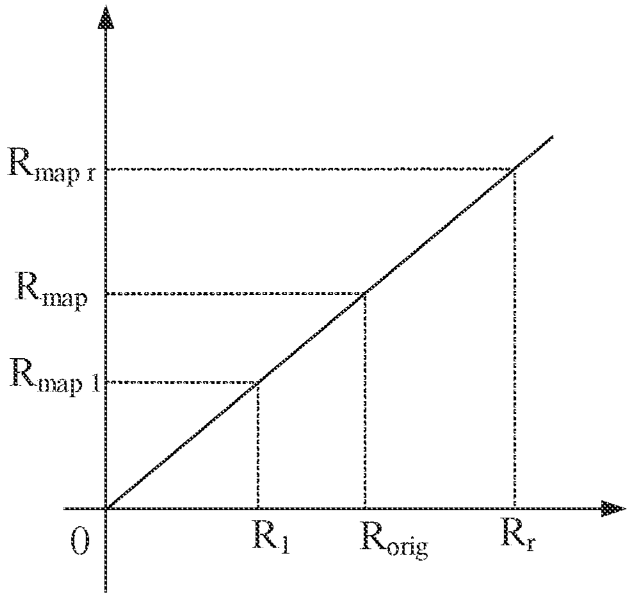
FIG. 3B is a schematic diagram of a linear interpolation algorithm, in accordance with some embodiments.

In S308, the group of RGB mapped data corresponding to the group of original RGB data is calculated by using the predetermined interpolation algorithm according to a group of first RGB mapped data corresponding to the group of first target RGB data and a group of second RGB mapped data corresponding to the group of second target RGB data, For example, as shown in FIG. 3B, the predetermined interpolation algorithm is a linear interpolation algorithm. The R value included in the group of original RGB data is different from any selected R value. R1 is a selected R value in the group of first target RGB data, Rr is a selected R value in the group of second target RGB data, $R_{map\ 1}$ is a mapped value of a selected R value included in the group of RGB mapped data corresponding to the group of first target RGB data, $R_{map\ r}$ is a mapped value of a selected R value included in the group of RGB mapped data corresponding to the group of second target RGB data, $R_{orig}$ is the R value included in the group of original RGB data, and $R_{map}$ is a mapped value, obtained through interpolation, of the R value included in the group of original RGB data, Then $$R_{map} = R_{map1} + \frac{R_{mapr} - R_{map1}}{R_r - R_1} \times (R_{orig} - R_1) \tag{1}$$

By using the above linear interpolation calculation formula, mapped values of other R values in a segment of any selected R value may be obtained through calculation. Similarly, methods for calculating the G value and the B value may be known, which will not be repeated here.

In some embodiments, the signal source data with known mapped values in the display LUT is stored as an address in the display LUT. For the group of original RGB data that requires to be calculated through interpolation, with 8 bit as an example, low 2 bit in the signal source data may be used to represent offset (e.g. 0, 1, 2 or 3) of the group of original RGB data in each segment, that is, a position of the value in the segment, and high 6 bit in the signal source data may be used to represent a position of the segment (e.g., one of a 0th segment to a 63th segment) that the group of original RGB data is in. In this way, during input of data, a corresponding method for calling or calculating a group of RGB mapped data may be used according to different contents recorded in the data.

In S110, the image after the color modulation is output from the display.

Since the group of original RGB data has been converted into the group of RGB mapped data, the color modulation is performed by using the group of RGB mapped data, and then the image after the color modulation is output, thereby completing the color modulation of the display.

For the color modulation method for the display provided by the embodiments of the present disclosure, it is determined whether the group of RGB mapped data corresponding to the group of original RGB data is present in the display LUT; in a case where the group of RGB mapped data corresponding to the group of original RGB data is present in the display LUT, the color modulation is performed on the image directly by using the group of RGB mapped data corresponding to the group of original RGB data; in a case where no group of RGB mapped data corresponding to the group of original RGB data is present in the display LUT, the group of RGB mapped data corresponding to the group of original RGB data is calculated by using the predetermined interpolation algorithm, and the color modulation is performed on the image by using the group of RGB mapped data obtained through calculation; and then the image after the color modulation is output. By using the color modulation method, a small amount of groups of mapped data may be stored in the display LUT, so that the display LUT may occupy a small number of hardware resources. For the color modulation method provided by the embodiments of the present disclosure, by means of a combination of linearity and nonlinearity, the group of RGB mapped data finally output may not only meet requirements of color gamut, but also match optimal color requirements, and an occupancy rate of the hardware resources may be reduced by using the interpolation method.

Figure 4:
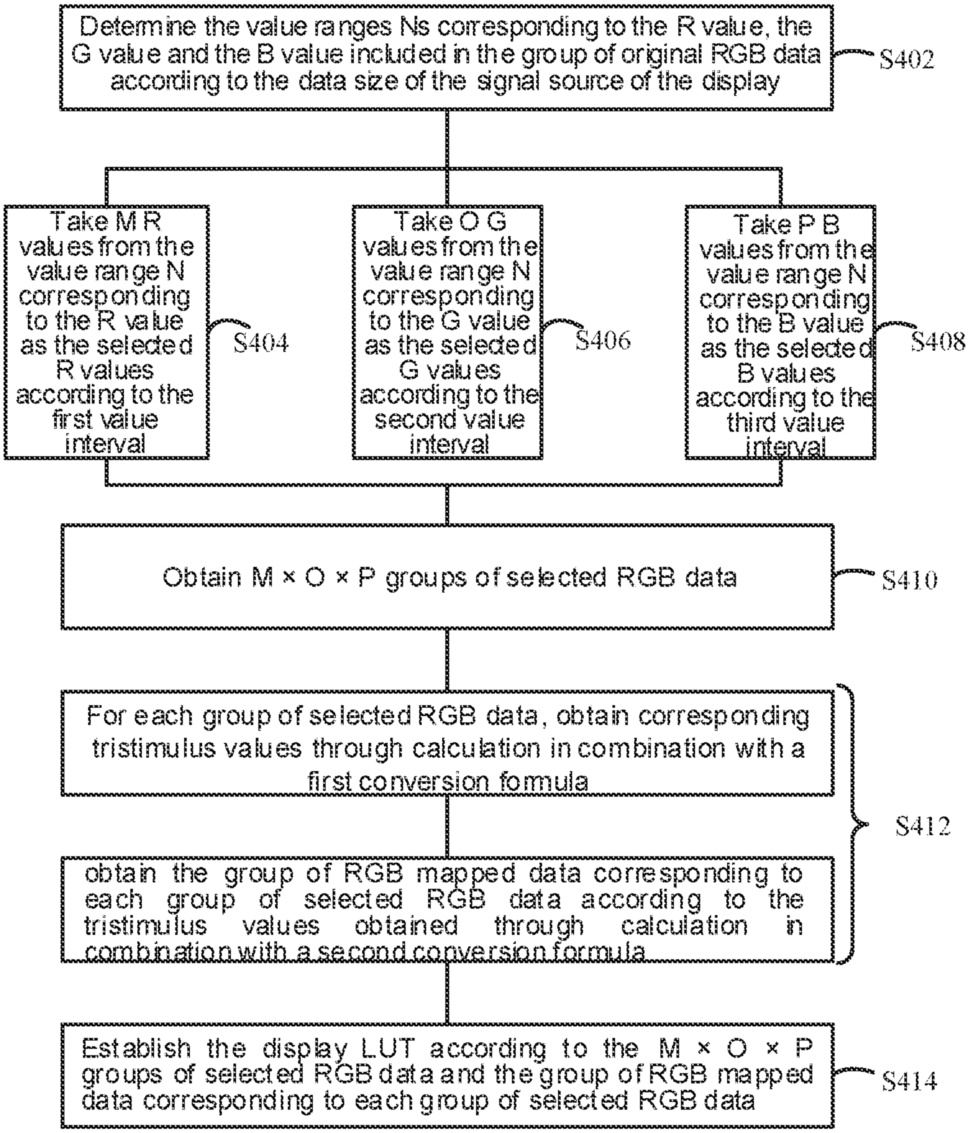
FIG. 4 is a flow diagram of establishing a look-up-table (LUT), in accordance with some embodiments.

In some embodiments, as shown in FIG. 4, the color modulation method further includes the following steps (402 to 414).

In S402, the value ranges Ns corresponding to the R value, the G value and the B value included in the group of original RGB data are determined according to the data size of the signal source of the display.

Signal source data of professional displays generally adopts 8 bit or 10 bit, and some higher-end displays may achieve 12 bit. For example, in the example where the data size of the signal source is 8 bit, the value ranges corresponding to the R value, the G value and the B value included in the group of original RGB data are all 0 to 255.

In S404, the M R values are taken from the value range N corresponding to the R value as the selected R values according to the first value interval.

The first value interval may be selected as required. For example, if N is 0 to 255, the first value interval may be 2, 4, 8 or the like, and correspondingly, M is 128, 64, 32 or the like.

In S406, the O G values are taken from the value range N corresponding to the G value as the selected G values according to the second value interval.

The second value interval may be selected as required. For example, if N is 0 to 255, the second value interval may be 2, 4, 8 or the like, and correspondingly, M is 128, 64, 32 or the like.

In S408, the P B values are taken from the value range N corresponding to the B value as the selected B values according to the third value interval.

The third value interval may be selected as required. For example, if N is 0 to 255, the third value interval may be 2, 4, 8 or the like, and correspondingly, M is 128, 64, 32 or the like.

The first value interval, the second value interval and the third value interval may be same or different, or two of them take a same value and the other one takes a different value, which may be selected according to requirements.

In S410, the M×O×P groups of selected RGB data are obtained.

For example, if the first value interval, the second value interval, and the third value interval are equal and are all 4, M, O and P are all 64, and then $64^3$ groups of selected RGB data may be obtained.

Considering an example where the first value interval, the second value interval and the third value interval are all 4, first values of the selected R value, the selected G value and the selected B value are all 0, and the values of the selected R values, the selected G values and the selected B values all include 0, 4, 8, 12, . . . , 124, 128, 132, 136, . . . , 248 and 252.

In some embodiments, the value of the first value interval is the a-th power of 2, so that the selected R values may divide the value range N corresponding to the R value into a plurality of segments with equal intervals except a last segment: the value of the second value interval is the b-th power of 2, so that the selected G values may divide the value range N corresponding to the G value into a plurality of segments with equal intervals except a last segment; the value of the third value interval is the c-th power of 2, so that the selected B values may divide the value range N corresponding to the B value into a plurality of segments with equal intervals except a last segment, where a, b and c are all positive integers, and the first value interval, the second value interval, and the third value interval are all smaller than the value ranges Ns In some embodiments. the values of the first value interval, the second value interval and the third value interval are equal.

In S412, the group of RGB mapped data corresponding to each group of selected RGB data is calculated.

Calculating the group of RGB mapped data corresponding to each group of selected RGB data includes: for each group of selected RGB data, obtaining corresponding tristimulus values through calculation in combination with a first conversion formula; and obtaining the group of RGB mapped data corresponding to each group of selected RGB data according to the tristimulus values obtained through calculation in combination with a second conversion formula. The first conversion formula is that the tristimulus values are equal to a first conversion matrix multiplied by a group of RGB data, and the second conversion formula is that the tristimulus values are equal to a second conversion matrix multiplied by a group of RGB mapped data.

Figure 5:
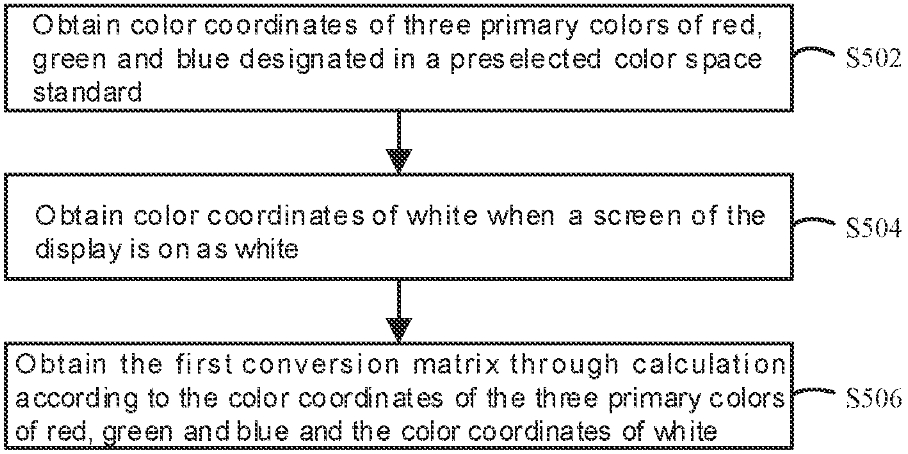
FIG. 5 is a flow diagram of calculating a first conversion formula, in accordance with some embodiments.

In some embodiments, as shown in FIG. 5, a calculation method of the first conversion formula includes the following steps (S502 to S506).

In S502, color coordinates of three primary colors of red, green and blue designated in a preselected color space standard are obtained.

In S504, color coordinates of white when a screen of the display is on as white are obtained. The color coordinates of white when the screen is on as white may be obtained through detection by an optical instrument.

For example, with the BT709 standard as an example, CIE1931 coordinates of the three primary colors of red, green and blue designated in this standard, and the color coordinates of white when the screen is on as white are shown in Table 1 below.

TABLE 1

| Color | BT709 standard | | | Screen characteristics |
|---|---|---|---|---|
| coordinates | R | G | B | W |
| x | 0.64 | 0.3 | 0.15 | 0.2731 |
| y | 0.33 | 0.6 | 0.06 | 0.3141 |
| z | 0.03 | 0.1 | 0.79 | 0.4128 |

The first conversion formula is:

$$\begin{bmatrix} X \\ Y \\ Z \end{bmatrix} = [H]_{3\times 3} \begin{bmatrix} R \\ G \\ B \end{bmatrix} \tag{2}$$

Where X, Y and Z are observer spectral tristimulus values, which are abbreviated as the tristimulus values; R, G and B are the croup of original RGB data; a relationship between X, Y and Z and R, G and B is that the tristimulus values are equal to the first conversion matrix multiplied by the group of RGB data, i.e., the first conversion formula.

In S506, the first conversion matrix is obtained through calculation according to the color coordinates of the three primary colors of red, green and blue and the color coordinates of white.

For example, according to the data in Table 1, an intermediate matrix is calculated according to the following formula:

$$\begin{pmatrix} Sr \\ Sg \\ Sb \end{pmatrix} = \begin{pmatrix} x_r & x_g & x_b \\ y_r & y_g & y_{b'} \\ z_r & z_g & z_b \end{pmatrix}^{-1} \begin{pmatrix} x_w / y_w \\ y_w / y_w \\ z_w / y_w \end{pmatrix} \quad (3)$$

Where $$\begin{pmatrix} x_r & x_g & x_b \\ y_r & y_g & y_{b'} \\ z_r & z_g & z_b \end{pmatrix}^{-1}$$

is an inverse matrix of color coordinates of R, G and B, and $x_w$, $y_w$ and $z_w$ are the color coordinates of white.

The first conversion matrix H may be calculated according to the following formula:

$$H = \begin{pmatrix} x_r & x_g & x_b \\ y_r & y_g & y_b \\ z_r & z_g & z_b \end{pmatrix} \begin{pmatrix} S_r & 0 & 0 \\ 0 & S_g & 0 \\ 0 & 0 & S_b \end{pmatrix} \quad (4)$$

After intermediate values Sr, Sg and Sb obtained through calculation by using Formula (3) are converted into a diagonal matrix, the diagonal matrix is multiplied by the color coordinates of the group of original R, G and B, and then the first conversion matrix H may be obtained. With the data in Table 1 as an example, it may be obtained through calculation that:

$$H = \begin{bmatrix} 0.258 & 0.389 & 0.223 \\ 0.133 & 0.778 & 0.089 \\ 0.012 & 0.123 & 1.172 \end{bmatrix}_{3\times3} \quad (5)$$

Then, it may be obtained that the first conversion formula is:

$$\begin{bmatrix} X \\ Y \\ Z \end{bmatrix} = \begin{bmatrix} 0.258 & 0.389 & 0.223 \\ 0.133 & 0.778 & 0.089 \\ 0.012 & 0.123 & 1.172 \end{bmatrix}_{3\times3} \begin{bmatrix} R \\ G \\ B \end{bmatrix} \quad (6)$$

The first conversion matrix H in the first conversion formula (2) is obtained through calculation according to the data in Table 1. The first conversion matrix H may be different in a case where different color space standards are used. Depending on a desired standard for the display itself, a value of the first transformation matrix H may change.

Figure 6:
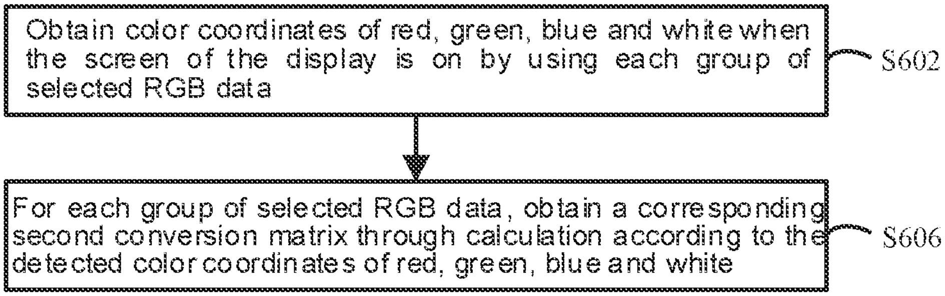
FIG. 6 is a flow diagram of calculating a second conversion formula, in accordance with some embodiments.

In some embodiments, as shown in FIG. 6, a calculation method of the second conversion formula includes the following steps (S602 to S606).

In S602, color coordinates of red, green, blue and white when the screen of the display is on by using each group of selected RGB data are obtained. The color coordinates of red, green, blue and white when the screen of the display is on by using the group of selected RGB data may be obtained through detection by the optical instrument.

For example, when the screen of the display is on as white, the color coordinates of red, green, blue and white of the display obtained through detection by the optical instrument are shown in Table 2 below.

TABLE 2

| Color coordinates | Screen characteristics R' | G' | B' | W |
|---|---|---|---|---|
| x | 0.675 | 0.258 | 0.144 | 0.2731 |
| y | 0.32 | 0.667 | 0.088 | 0.3141 |
| z | 0.005 | 0.075 | 0.768 | 0.4128 |

The second conversion formula is:

$$\begin{bmatrix} X \\ Y \\ Z \end{bmatrix} = [I]_{3\times3} \begin{bmatrix} R' \\ G' \\ B' \end{bmatrix} \quad (7)$$

Where X, Y and Z are the observer spectral tristimulus values, which are abbreviated as the tristimulus values; R', G' and B' are the group of RGB mapped data corresponding to the group of original RGB data; a relationship between X, Y and Z and R', G' and B' is that the tristimulus values are equal to the second conversion matrix multiplied by the group of RGB mapped data, i.e., the second conversion formula.

It may be obtained therefrom that:

$$\begin{bmatrix} R' \\ G' \\ B' \end{bmatrix} = [I^{-1}]_{3\times3} \begin{bmatrix} X \\ Y \\ Z \end{bmatrix} \quad (8)$$

It can be seen from Formula (8) that, the group of RGB mapped data is a product of the tristimulus values and an inverse matrix of the second conversion matrix, and the tristimulus values may be obtained through calculation according to the first conversion formula (6). That is, the group of RGB mapped data may be obtained through calculation as long as the second conversion matrix is known.

In 606, for each group of selected RGB data, a corresponding second conversion matrix is obtained through calculation according to the detected color coordinates of red, green, blue and white.

For example, according to the data in Table 2, an intermediate matrix is calculated according to the following formula:

$$\begin{pmatrix} Sr' \\ Sg' \\ Sb' \end{pmatrix} = \begin{pmatrix} x_{r'} & x_{g'} & x_{b'} \\ y_{r'} & y_{g'} & y_{b'} \\ z_{r'} & z_{g'} & z_{b'} \end{pmatrix}^{-1} \begin{pmatrix} x_{w'} / y_{w'} \\ y_{w'} / y_{w'} \\ z_{w'} / y_{w'} \end{pmatrix} \quad (9)$$

Where $$\begin{pmatrix} x_{r'} & x_{g'} & x_{b'} \\ y_{r'} & y_{g'} & y_{b'} \\ z_{r'} & z_{g'} & z_{b'} \end{pmatrix}^{-1}$$

is an inverse matrix of the color coordinates of R', G' and B', and $x_w$, $y_w$, and $z_w$ are the color coordinates of white.

The second conversion matrix I may be calculated according to the following formula:

$$I = \begin{pmatrix} x_{r'} & x_{g'} & x_{b'} \\ y_{r'} & y_{g'} & y_{b'} \\ z_{r'} & z_{g'} & z_{b'} \end{pmatrix} \begin{pmatrix} S_{r'} & 0 & 0 \\ 0 & S_{g'} & 0 \\ 0 & 0 & S_{b'} \end{pmatrix} \tag{10}$$

After intermediate values Sr', Sg' and Sb' obtained through calculation by using Formula (9) are converted into a diagonal matrix, the diagonal matrix is multiplied by the color coordinates of R', G' and B', and then the second conversion matrix I may be obtained. With the data in Table 2 as an example, it may be obtained through calculation that:

$$I = \begin{bmatrix} 0.375 & 0.263 & 0.232 \\ 0.178 & 0.681 & 0.141 \\ 0.003 & 0.077 & 1.235 \end{bmatrix}_{3\times 3} \tag{11}$$

Then, it may be obtained that when the screen of the display is on as white, the second conversion formula is:

$$\begin{bmatrix} X \\ Y \\ Z \end{bmatrix} = \begin{bmatrix} 0.375 & 0.263 & 0.232 \\ 0.178 & 0.681 & 0.141 \\ 0.003 & 0.077 & 1.235 \end{bmatrix}_{3\times 3} \begin{bmatrix} R' \\ G' \\ B' \end{bmatrix} \tag{12}$$

That is, the second conversion formula corresponds to a second conversion formula in a case where input RGB data is (255, 255, 255).

For a group of selected RGB data, a corresponding second conversion matrix may be calculated by using the above method, That is, for each group of selected RGB data, there is a corresponding second conversion matrix for calculating corresponding group of RGB mapped data, so that the group of RGB mapped data corresponding to each group of selected RGB data may be obtained through calculation.

In S414, the display LUT is established according to the M×O×P groups of selected RGB data and the group of RGB mapped data corresponding to each group of selected RGB data.

Through the above method, the establishment of the display LUT may be completed, and the display LUT includes the M×O×P groups of selected RGB data and the group of RGB mapped data corresponding to each group of selected RGB data. In a case where the group of input original RGB data is the same as the group of selected RGB data, the corresponding group of RGB mapped data may be found in the display LUT, so as to complete the color modulation of the image. In addition, since the group of selected RGB data is only some groups of original RGB data within the range of the groups of original RGB data, the amount of data stored in the display LUT is small, so that the hardware resources may be saved.

It will be noted that, the method provided by the embodiments of the present disclosure may be performed by a single device, such as a computer or a server. The method provided by the embodiments of the present disclosure may also be applied to a distributed scenario, and is performed by a plurality of devices in cooperation with each other. In a case where the method is applied to the distributed scenario, one of the plurality of devices may perform only one or more steps of the method provided by the embodiments of the present disclosure, and the plurality of devices may interact with each other to perform the color modulation method for the display.

Figure 7:
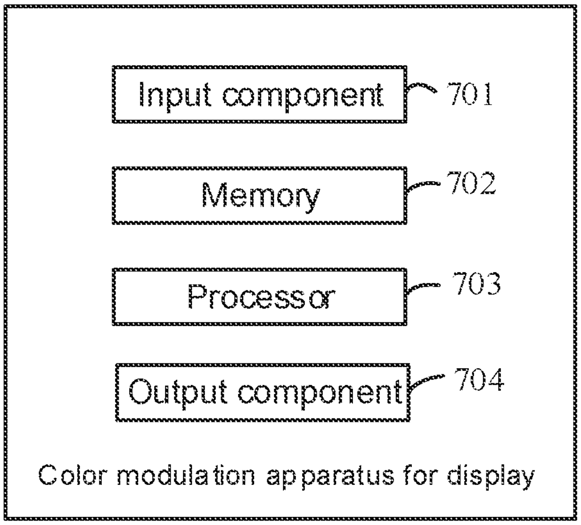
FIG. 7 is a diagram showing a structure of a color modulation apparatus, in accordance with some embodiments.

Some embodiments of the present disclosure provide a color modulation apparatus for a display. As shown in FIG. 7, the color modulation apparatus includes an input component 701, a memory 702, a processor 703 and an output component 704.

The input component 701 is configured to obtain a group of original RGB data of a pixel of an image.

The memory 702 stores a display look-up-table (LUT).

The display LUT includes a plurality of groups of selected RGB data, and a group of RGB mapped data corresponding to each group of selected RGB data; the groups of selected RGB data are some groups of original RGB data selected from groups of original RGB data corresponding to the display according to a preset manner within value ranges of the groups of original RGB data corresponding to the display.

The processor 703 is configured to;

call the display LUT to determine whether a group of RGB mapped data corresponding to the group of original RGB data is present in the display LUT;

in a case where the group of RGB mapped data corresponding to the group of original RGB data is present in the display LUT, perform color modulation on the image by using the group of RGB mapped data corresponding to the group of original RGB data; and in a case where no group of RGB mapped data corresponding to the group of original RGB data is present in the display LUT, calculate the group of RGB mapped data corresponding to the group of original RGB data by using the group of original RGB data, the plurality of groups of selected RGB data, and the group of RGB mapped data corresponding to each group of selected RGB data, in combination with a predetermined interpolation algorithm, and perform the color modulation on the image by using the group of RGB mapped data obtained through calculation.

The output component 704 is configured to output the image after the color modulation from the display.

For the color modulation apparatus for the display provided by the embodiments of the present disclosure determines, it is determined whether the group of RGB mapped data corresponding to the group of original RGB data is present in the display LUT; in the case where the group of RGB mapped data corresponding to the group of original RGB data is present in the display LUT, the color modulation is performed on the image directly by using the group of RGB mapped data corresponding to the group of original RGB data; in a case where no group of RGB mapped data corresponding to the group of original RGB data is present in the display LUT, the group of RGB mapped data corresponding to the group of original RGB data is calculated by using the predetermined interpolation algorithm, and the color modulation is performed on the image by using the group of RGB mapped data obtained through calculation; and then the image after the color modulation is output. By using the color modulation method, a small amount of groups of mapped data may be stored in the display LUT, so that the display LUT may occupy a small number of hardware resources. For the color modulation method provided by the embodiments of the present disclosure, by means of a combination of linearity and nonlinearity, the group of RGB mapped data finally output may not only meet requirements of color gamut, but also match optimal color requirements, and an occupancy rate of the hardware resources may be reduced by using the interpolation method.

In some embodiments, the processor 7 03 is configured to:

determine value ranges Ns corresponding to a R value, a G value and a B value included in the group of original RGB data according to a data size of a signal source of the display;

take M R values from a value range N corresponding to the R value as selected R values according to a first value interval;

take O G values from a value range N corresponding to the G value as selected G values according to a second value interval;

take P B values from a value range N corresponding to the B value as selected B values according to a third value interval;

obtain M×O×P groups of selected RGB data;

calculate group of RGB mapped data corresponding to each group of selected RGB data, which includes: for each group of selected RGB data in the M×O×P groups of selected RGB data, obtaining corresponding tristimulus values through calculation in combination with a first conversion formula; and obtaining the group of RGB mapped data corresponding to each group of selected RGB data according to the tristimulus values obtained through calculation in combination with a second conversion formula; and establish the display LUT according to the M×O×P groups of selected RGB data and the group of RGB mapped data corresponding to each group of selected RGB data.

In some embodiments, the processor 703 is configured to:

determine a segment that the R value in the group of original RGB data is in in the M selected R values, a segment that the G value in the group of original RGB data is in in the O selected G values, and a segment that the B value in the group of original RGB data is in the P selected B values according to the group of original RGB data and the plurality of groups of selected RGB data; and determine a group of first target RGB data according to small endpoint values of segments that the R value, the G value and the B value in the group of original RGB data are respectively in; determine a group of second target RGB data according to large endpoint values of the segments that the R value, the G value and the B value in the group of original RGB data are respectively in; and calculate the group of RGB mapped data corresponding to the group of original RGB data using the predetermined interpolation algorithm in combination with the group of original RGB data, a group of RGB mapped data corresponding to the group of first target RGB data, and a group of RGB mapped data corresponding to the group of second target RGB data.

In some embodiments, the processor 703 is configured to:

obtain color coordinates of three primary colors of red, green and blue designated in a preselected color space standard;

obtain color coordinates of white when a screen of the display is on as white; and obtain a first conversion matrix through calculation according to the color coordinates of the three primary colors of red, green and blue and the color coordinates of white in combination with the first conversion formula, wherein the first conversion formula is that the tristimulus values are equal to the first conversion matrix multiplied by a group of RGB data.

In some embodiments, the processor 703 is configured to:

light the display by using each group of selected RGB data in the M×O×P groups of selected RGB data;

obtain color coordinates of red, green, blue and white when the screen of the display is on according to each group of selected RGB data; and for each group of selected RGB data, obtain a corresponding second conversion matrix through calculation according to the corresponding detected color coordinates of red, green, blue and white in combination with the second conversion formula, wherein the second conversion formula is that the tristimulus values are equal to the second conversion matrix multiplied by a group of RGB mapped data.

For convenience of description, when described, the color modulation apparatus is divided into various modules according to functions. During implementation, the functions of the modules may be implemented in a single piece or more pieces of software and/or hardware.

The color modulation apparatus for the display provided by the embodiments of the present disclosure is used to implement the color modulation method for the display in the above embodiments, and has same beneficial effects as the color modulation method for the display. The details will not be repeated here.

Figure 8:
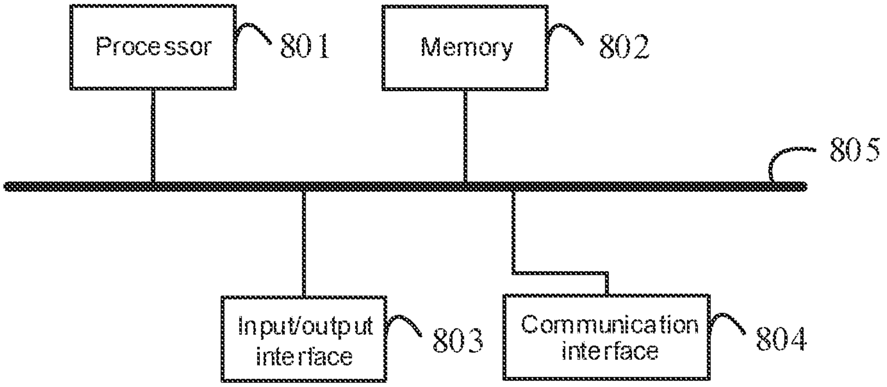
FIG. 8 is a diagram showing a hardware structure of an electronic device, in accordance with some embodiments.

Some embodiments of the present disclosure further provide an electronic device. Referring to FIG. 8, the electronic device may include a processor 801, a memory 802, an input/output interface 803, a communication interface 804 and a bus 805. The processor 801, the memory 802, the input/output interface 803 and the communication interface 804 are communicatively connected to each other inside the device through the bus 805.

The processor 801 may be implemented by using a general central processing unit (CPU), a microprocessor, an application specific intearated circuit (ASIC), or one or more integrated circuits, and is used to execute related programs to implement the color modulation method provided by the embodiments of the present disclosure.

The memory 802 may be implemented in a form of a read only memory (ROM), a random access memory (RAM), a static storage device, a dynamic storage device or the like. The memory 802 may store an operating system and other application programs, In a case where the color modulation method for the display provided by the embodiments of the present disclosure is implemented by means of software or firmware, related program codes are stored in the memory 802, and are called for execution by the processor 801.

The input/output interface 803 is used to be connected to an input/output component to realize input and output of information. An input/output module (not shown in the figure) may be configured as a component in the device, or may be an external module connected to the device to provide corresponding functions. An input device may include a keyboard, a mouse, a touch screen, a microphone or a sensor. An output device may include a display, a speaker, a vibrator or an indicator light.

The communication interface 804 is used to be connected to a communication module (not shown in the figure), so as to realize communication interaction between the device and another device. The communication module may realize communication in a wired manner (e.g., through universal serial bus (USB) or network cables), or in a wireless manner (e.g., through mobile network, Wireless Fidelity (WIFI) or Bluetooth).

The bus 805 includes a path for transmitting information between various components (e.g., the processor 801, the memory 802, the input/output interface 803 and the communication interface 804) of the device.

It will be noted that, although only the processor 801, the memory 802, the input/output interface 803, the communication interface 804 and the bus 805 of the device are shown, during implementation, the device may further include other components necessary for realizing normal operation.

In addition, it may be understood for a person skilled in the art that, the device may include only components necessary for implementing the solutions in the embodiments of the present disclosure, and does not need to include all the components shown in the figure.

Some embodiments of the present disclosure provide a computer-readable storage medium (e.g., a non-transitory computer-readable storage medium). The computer-readable storage medium stores therein computer program instructions that, when running on a processor, cause the processor to perform one or more steps in the color modulation method as described in any of the above embodiments.

The computer-readable storage medium includes permanent and non-permanent, and removable and non-removable media, and may realize information storage through any method or technology. The information may be computer-readable instructions, data structures, program modules or other data. Examples of the computer storage media include, but are not limited to, a phase-change random access memory (PRAM), a static random access memory (SRAM) a dynamic random access memory (DRAM), a random access memory (RAM) of any other type, a read-only memory (ROM), an electrically erasable programmable read-only memory (EEPROM), a flash memory or any other memory technology, a compact disc read-only memory (CD-ROM), a digital versatile disc (DVD) or any other optical storage, a cassette magnetic tape, magnetic tape storage, magnetic disk storage or any other magnetic storage device or any other non-transmission medium, which may be used to store information that may be accessed by a computing device.

Various computer-readable storage media described in the embodiments of the present disclosure may represent one or more devices and/or other machine-readable storage media, which are used for storing information. The term "machine-readable storage media" may include, but is not limited to, wireless channels and various other media capable of storing, containing and/or carrying instructions and/or data.

Some embodiments of the present disclosure further provide a computer program product. The computer program product includes computer program instructions that, when executed by a computer, cause the computer to perform one or more steps in the color modulation method for the display as described in the above embodiments.

Some embodiments of the present disclosure further provide a computer program. When executed by a computer, the computer program causes the computer to perform one or more steps in the color modulation method for the display as described in the above embodiments.

Beneficial effects of the computer-readable storage medium, the computer program product, and the computer program are same as the beneficial effects of the method as described in some embodiments described above, and details will not be repeated here.

The specific embodiments of the present disclosure have been described above. Other embodiments are within the scope of the appended claims. In some cases, actions or steps recited in the claims may be performed in an order different from that in the embodiments, and desired results may still be realized, In addition, processes described in the drawings do not necessarily require the given order or consecutive order shown to achieve the desired results. In some embodiments, multitasking and parallel processing are also possible or may be advantageous.

It will be understood for a person skilled in the art that, the discussion of any of the above embodiments is merely exemplary, and is not intended to imply that the scope of the present disclosure (including the claims) is limited to these examples. In the spirit of the present disclosure, technical features in the above embodiments or different embodiments may also be combined, the steps may be performed in any order, and there are numerous other variations of different aspects of one or more embodiments of the present disclosure, which are not provided in detail for brevity.

In addition, in order to simplify the description and discussion, and in order not to obscure one or more embodiments of the present disclosure, well-known power/ground connections to integrated circuit (IC) chips and other components may or may not be shown in the provided drawings. In addition, the apparatus/device may be shown in a form of a block diagram, so as to avoid obscuring one or more embodiments of the present disclosure, and the following fact is also taken into account that details of implementation of the apparatus/device shown in the form of the block diagram are highly dependent on a platform on which one or more embodiments of the present disclosure will be implemented (i.e., these details should be well within the understanding of a person skilled in the art). In a case where the details (e.g., circuits) are illustrated to describe exemplary embodiments of the present disclosure, it is obvious to a person skilled in the art that, one or more embodiments of the present disclosure may be implemented without these details or with variations of these details. Therefore, these descriptions should be considered as illustrative rather than restrictive.

Although the present disclosure has been described in combination with the embodiments thereof, numerous alternatives, modifications and variations of these embodiments are obvious to a person skilled in the art according to the foregoing description. For example, other memory architectures (e.g., the DRAM) may use the discussed embodiments.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A color modulation method for a display, the color modulation method comprising:

obtaining a group of original RGB data of a pixel of an image;

calling a display look-up-table (LUT) to determine whether a group of RGB mapped data corresponding to the group of original RGB data is present in the display LUT; wherein the display LUT includes a plurality of groups of selected RGB data and a group of RGB mapped data corresponding to each group of selected RGB data; the groups of selected RGB data are some groups of original RGB data selected from groups of original RGB data corresponding to the display within value ranges of the groups of original RGB data corresponding to the display;

if the group of RGB mapped data corresponding to the group of original RGB data is present in the display LUT, performing color modulation on the image using the group of RGB mapped data corresponding to the group of original RGB data; and if no group of RGB mapped data corresponding to the group of original RGB data is present in the display LUT, calculating the group of RGB mapped data corresponding to the group of original RGB data using the group of original RGB data, the plurality of groups of selected RGB data and the group of RGB mapped data corresponding to each group of selected RGB data in combination with a predetermined interpolation algorithm, and performing the color modulation on the image using the group of RGB mapped data obtained through calculation;

the color modulation method further comprising:

determining value ranges Ns corresponding to a R value, a G value and a B value included in the group of original RGB data according to a data size of a signal source of the display;

taking M R values from a value range N corresponding to the R value as selected R values according to a first value interval;

taking O G values from a value range N corresponding to the G value as selected G values according to a second value interval;

taking P B values from a value range N corresponding to the B value as selected B values according to a third value interval;

obtaining M×O×P groups of selected RGB data according to the M selected R values, O selected G values and P selected B values;

calculating the group of RGB mapped data corresponding to each group of selected RGB data; and establishing the display LUT according to the M×O×P groups of selected RGB data and the group of RGB mapped data corresponding to each group of selected RGB data.

2. The color modulation method according to claim 1, wherein a value of the first value interval is an a-th power of 2, a value of the second value interval is a b-th power of 2, and a value of the third value interval is a c-th power of 2; wherein a, b and c are all positive integers, and the first value interval, the second value interval, and the third value interval are all smaller than the value ranges Ns.

3. The color modulation method according to claim 1, wherein values of the first value interval, the second value interval and the third value interval are equal.

4. The color modulation method according to claim 1, wherein calculating the group of RGB mapped data corresponding to the group of original RGB data using the group of original RGB data, the plurality of groups of selected RGB data and the group of RGB mapped data corresponding to each group of selected RGB data, in combination with the predetermined interpolation algorithm includes:

determining a segment that the R value included in the group of original RGB data is in in the M selected R values, a segment that the G value included in the group of original RGB data is in in the O selected G values, and a segment that the B value included in the group of original RGB data is in in the P selected B values according to the group of original RGB data and the plurality of groups of selected RGB data;

determining a group of first target RGB data according to small endpoint values of segments that the R value, the G value and the B value in the group of original RGB data are respectively in;

determining a group of second target RGB data according to large endpoint values of the segments that the R value, the G value and the B value in the group of original RGB data are respectively in; and calculating the group of RGB mapped data corresponding to the group of original RGB data using the predetermined interpolation algorithm in combination with the group of original RGB data, a group of RGB mapped data corresponding to the group of first target RGB data and a group of RGB mapped data corresponding to the group of second target RGB data.

5. The color modulation method according to claim 4, wherein the predetermined interpolation algorithm is a linear interpolation algorithm.

6. The color modulation method according to claim 1, wherein calculating the group of RGB mapped data corresponding to each group of selected RGB data includes:

for each group of selected RGB data, obtaining corresponding tristimulus values through calculation in combination with a first conversion formula, wherein the first conversion formula is that the tristimulus values are equal to a first conversion matrix multiplied by a group of RGB data; and obtaining the group of RGB mapped data corresponding to each group of selected RGB data according to the tristimulus values obtained through calculation in combination with a second conversion formula, wherein the second conversion formula is that the tristimulus values are equal to a second conversion matrix multiplied by a group of RGB mapped data.

7. The color modulation method according to claim 6, wherein a calculation method of the first conversion matrix includes:

obtaining color coordinates of three primary colors of red, green and blue designated in a preselected color space standard;

obtaining color coordinates of white when a screen of the display is on as white; and obtaining the first conversion matrix through calculation according to the color coordinates of the three primary colors of red, green and blue and the color coordinates of white in combination with the first conversion formula.

8. The color modulation method according to claim 6, wherein a calculation method of the second conversion matrix includes:

obtaining color coordinates of red, green, blue and white when a screen of the display is on using each group of selected RGB data; and for each group of selected RGB data, obtaining a corresponding second conversion matrix through calculation according to the obtained color coordinates of red, green, blue and white in combination with the second conversion formula.

9. The color modulation method according to claim 1, further comprising:

outputting the image after the color modulation from the display.

10. An electronic device, comprising a memory, a processor and computer programs stored in the memory and executable on the processor; when executing the computer programs, the processor performs one or more steps in the color modulation method for the display according to claim 1.

11. A non-transitory computer-readable storage medium having stored therein computer instructions, the computer instructions being configured to perform one or more steps in the color modulation method for the display according to claim 1.

12. A color modulation apparatus for a display, the color modulation apparatus comprising:

an input component configured to obtain a group of original RGB data of a pixel of an image;

a memory storing a display look-up-table (LUT) thereon, wherein the display LUT includes a plurality of groups of selected RGB data, and a group of RGB mapped data corresponding to each group of selected RGB data, and the groups of selected RGB data are some groups of original RGB data selected from groups of original RGB data corresponding to the display within value ranges of the groups of original RGB data corresponding to the display; and a processor configured to: call the display LUT to determine whether a group of RGB mapped data corresponding to the group of original RGB data is present in the display LUT; in a case where the group of RGB mapped data corresponding to the group of original RGB data is present in the display LUT, perform color modulation on the image using the group of RGB mapped data corresponding to the group of original RGB data; and in a case where no group of RGB mapped data corresponding to the group of original RGB data is present in the display LUT, calculate the group of RGB mapped data corresponding to the group of original RGB data using the group of original RGB data, the plurality of groups of selected RGB data and the group of RGB mapped data corresponding to each group of selected RGB data in combination with a predetermined interpolation algorithm, and perform the color modulation on the image using the group of RGB mapped data obtained through calculation;

wherein the processor is further configured to:

determine value ranges Ns corresponding to a R value, a G value and a B value included in the group of original RGB data according to a data size of a signal source of the display;

take M R values from a value range N corresponding to the R value as selected R values according to a first value interval;

take O G values from a value range N corresponding to the G value as selected G values according to a second value interval;

take P B values from a value range N corresponding to the B value as selected B values according to a third value interval;

obtain M×O×P groups of selected RGB data according to the M selected R values, O selected G values and P selected B values;

calculate the group of RGB mapped data corresponding to each group of selected RGB data; and establish the display LUT according to the M×O×P groups of selected RGB data and the group of RGB mapped data corresponding to each group of selected RGB data.

13. The color modulation apparatus according to claim 12, wherein the processor is further configured to:

determine a segment that the R value in the group of original RGB data is in in the M selected R values, a segment that the G value in the group of original RGB data is in in the O selected G values, and a segment that the B value in the group of original RGB data is in in the P selected B values according to the group of original RGB data and the plurality of groups of selected RGB data; and determine a group of first target RGB data according to small endpoint values of segments that the R value, the G value and the B value in the group of original RGB data are respectively in; determine a group of second target RGB data according to large endpoint values of the segments that the R value, the G value and the B value in the group of original RGB data are respectively in; and calculate the group of RGB mapped data corresponding to the group of original RGB data using the predetermined interpolation algorithm in combination with the group of original RGB data, a group of RGB mapped data corresponding to the group of first target RGB data, and a group of RGB mapped data corresponding to the group of second target RGB data.

14. The color modulation apparatus according to claim 12, wherein the processor is further configured to:

for each group of selected RGB data, obtain corresponding tristimulus values through calculation in combination with a first conversion formula, wherein the first conversion formula is that the tristimulus values are equal to a first conversion matrix multiplied by a group of RGB data; and obtain the group of RGB mapped data corresponding to each group of selected RGB data according to the tristimulus values obtained through calculation in combination with a second conversion formula, wherein the second conversion formula is that the tristimulus values are equal to a second conversion matrix multiplied by a group of RGB mapped data.

15. The color modulation apparatus according to claim 14, wherein the processor is further configured to:

obtain color coordinates of three primary colors of red, green and blue designated in a preselected color space standard;

obtain color coordinates of white when a screen of the display is on as white; and obtain the first conversion matrix through calculation according to the color coordinates of the three primary colors of red, green and blue and the color coordinates of white in combination with the first conversion formula.

16. The color modulation apparatus according to claim 15, wherein the processor is further configured to:

light the display using each group of selected RGB data in the M×O×P groups of selected RGB data;

obtain color coordinates of red, green, blue and white when the screen of the display is on according to each group of selected RGB data; and for each group of selected RGB data, obtain a corresponding second conversion matrix through calculation according to the obtained color coordinates of red, green, blue and white in combination with the second conversion formula.

* * * * *

UNITED STATES PATENT AND TRADEMARK OFFICE

CERTIFICATE OF CORRECTION

PATENT NO. : 11,967,297 B2
APPLICATION NO. : 17/787106
DATED : April 23, 2024
INVENTOR(S) : Xian Wang and Masakazu Okamura It is certified that error appears in the above-identified patent and that said Letters Patent is hereby corrected as shown below:

In the Specification

In Column 2, Line 29, please change “in” to --in in--
In Column 2, Line 31, please change “in” to --in in--
In Column 2, Line 32, please change “is in” to --is in in--

In Column 3, Line 67, please change “in” to --in in--

In Column 4, Line 1, please change “is in” to --is in in--
In Column 4, Line 3, please change “in” to --in in--

In Column 5, Line 26, please change “embodiments:” to --embodiments;--

In Column 6, Line 46, please change “In 106” to --In S106--

In Column 7, Line 10, please change “202 to 204” to --S202 to S204--
In Column 7, Line 11, please change “In 202” to --In S202--
In Column 7, Line 12, please change “in” to --in in--
In Column 7, Line 13, please change “is in” to --is in in--

In Column 8, Line 7, please change “in” to --in in--
In Column 8, Line 8, please change “is in” to --is in in--
In Column 8, Line 10, please change “in” to --in in--
In Column 8, Line 41, please change “302 to 308” to --S302 to S308--

In Column 9, Line 12, please change “In 304” to --In S304--

In Column 11, Line 17, please change “402” to --S402--
In Column 11, Line 18, please change “414” to --S414--

Signed and Sealed this
Twentieth Day of August, 2024

Katherine Kelly Vidal

Katherine Kelly Vidal
*Director of the United States Patent and Trademark Office*

In Column 14, Line 49, please change “In 606” to --In S606--

In Column 17, Line 33, please change “is in” to --is in in--